United States Patent [19]

Ijuin

[11] Patent Number: 4,743,975

[45] Date of Patent: May 10, 1988

[54] IMAGE PROCESSING APPARATUS

[75] Inventor: Kazuya Ijuin, Tokyo, Japan

[73] Assignee: Canon Kabushiki Kaisha, Tokyo, Japan

[21] Appl. No.: 844,892

[22] Filed: Mar. 27, 1986

[30] Foreign Application Priority Data

| Apr. 1, 1985 | [JP] | Japan | 60-66601 |
| Apr. 1, 1985 | [JP] | Japan | 60-66602 |
| Apr. 1, 1985 | [JP] | Japan | 60-66603 |
| Apr. 2, 1985 | [JP] | Japan | 60-68494 |
| Apr. 2, 1985 | [JP] | Japan | 60-68495 |

[51] Int. Cl.$^4$ .......................................... H04M 1/17
[52] U.S. Cl. ..................................... 358/288; 358/293
[58] Field of Search ............... 358/288, 280, 286, 293, 358/294

[56] References Cited

U.S. PATENT DOCUMENTS

| 3,581,000 | 5/1971 | Hansen | 358/288 |
| 3,723,640 | 3/1973 | Perreauct | 358/288 |
| 3,931,464 | 1/1976 | Murase | 358/288 |
| 4,302,781 | 11/1981 | Ikeda et al. | 358/288 |
| 4,313,138 | 1/1982 | Kanda et al. | 358/288 |
| 4,367,493 | 1/1983 | Matteson | 358/288 |
| 4,591,727 | 5/1986 | Gaebelein et al. | 358/288 |
| 4,663,672 | 5/1987 | Sakamoto | 358/294 |

FOREIGN PATENT DOCUMENTS 54-16116  2/1979  Japan ................... 358/286

Primary Examiner—Edward L. Coles, Sr.
Attorney, Agent, or Firm—Fitzpatrick, Cella, Harper & Scinto

[57] ABSTRACT

An image processing apparatus such as a facsimile system has a CCD sensor for reading an original image, a detection circuit for detecting if a one-line image signal is a nearly black or white signal, a buffer memory for temporarily storing the image signal from the CCD sensor, and a microprocessor CPU for controlling the reading/recording operation in accordance with the detection result of the detection circuit. Image boundaries due to switching between reading and recording operations are eliminated from the reproduced image. A low-torque single motor may be used as a drive source in any of the transmission, reception and copying modes.

31 Claims, 14 Drawing Sheets

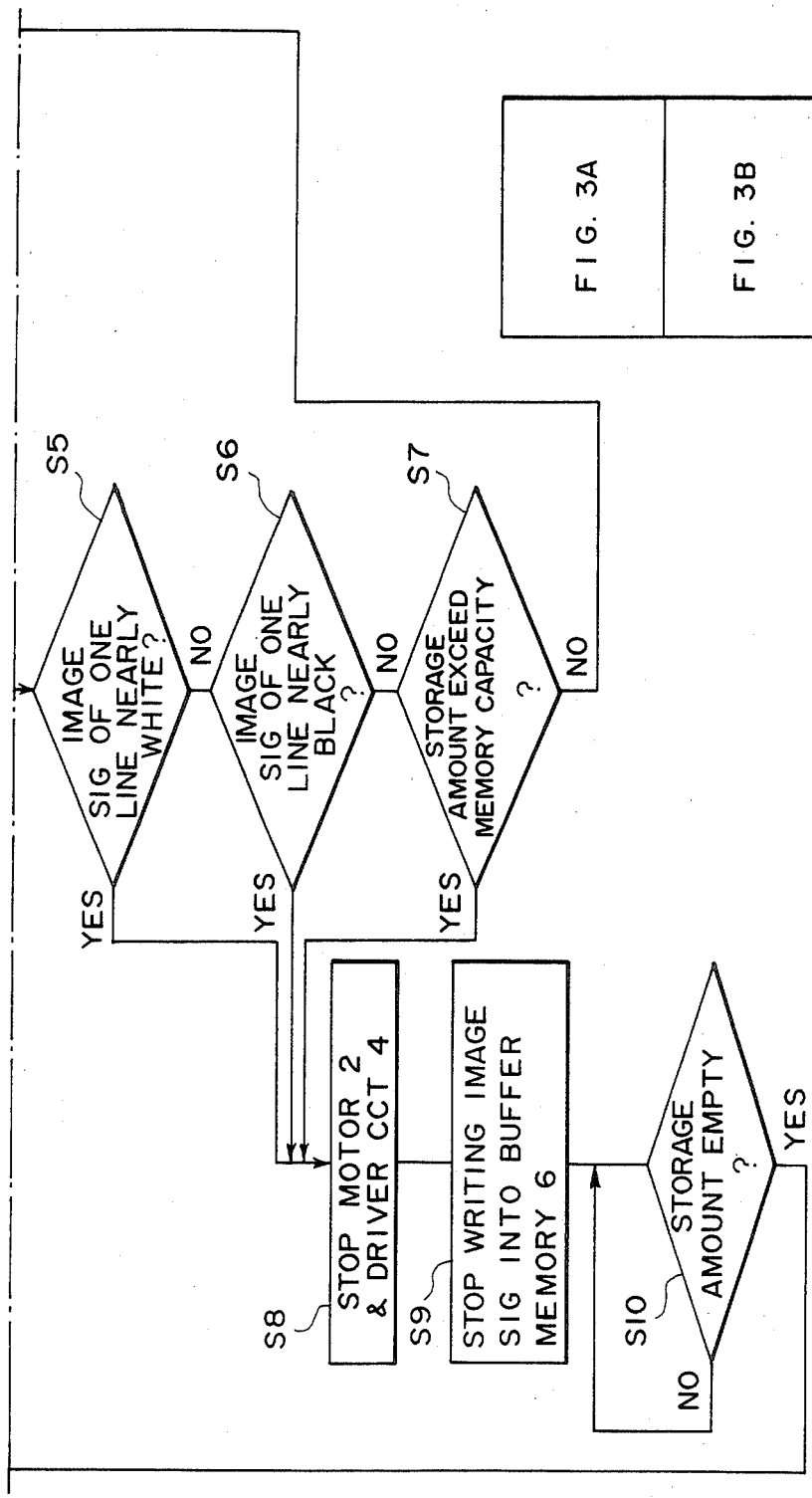

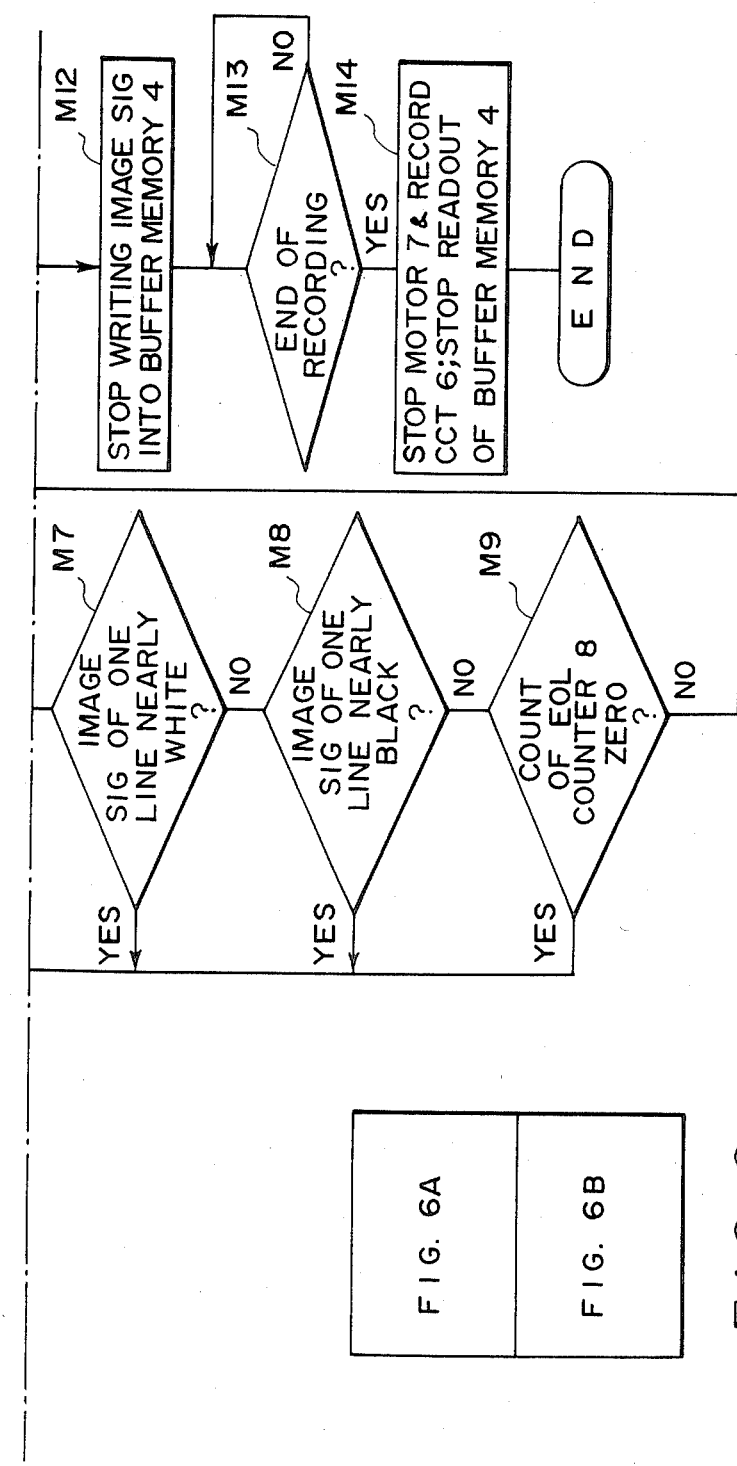

IMAGE PROCESSING APPARATUS

BACKGROUND OF THE INVENTION

1. Field of the Invention

The present invention relates to an image processing apparatus.

2. Related Background Art

An apparatus of the type described above, e.g., a facsimile system performs communication of image data. A facsimile system has three modes: transmission, reception, and copying modes. In the transmission mode, an original is read and read image data is sent. In the reception mode, the image data sent from another system is recorded on a recording medium such as paper. In the copying mode, an original is read and is recorded directly.

In systems as described above, an image is generally read in the following manner. As the image is read and a memory for temporarily storing the read image data becomes full, the image signals are read out from the memory and recorded. When the memory thus becomes empty, image reading is resumed. This operation is repeated.

However, in such a system, the image reading operation is interrupted each time the memory is full. Therefore, the reproduced image becomes discontinuous and a poor image.

When an image is recorded, image signals are stored in a buffer memory and are then read out therefrom for recording. When all image signals stored in the buffer memory are read out and recorded, the recording operation is interrupted. The recording operation resumes when image signals are stored in the buffer memory. For this reason, there may occur an image displacement at seam of a recorded image. In particular, when the capacity of the buffer memory used is small, the image quality is significantly degraded.

If the capacity of the buffer memory corresponds to one page of originals, the above problem is solved. However, this results in a requirement of a large-capacity memory, resulting in an expensive system.

In image reading/recording, at least two drive motors are used in most image communication apparatuses. More specifically, a read motor is used for reading originals, and a record motor is used for recording images. In the copying mode, both the motors are driven.

However, with a recent trend for smaller and inexpensive image communication apparatuses such as facsimile systems, the use of two motors is disadvantageous and the use of a single motor has been studied.

FIG. 7 shows an example of the construction of a facsimile system using a single motor. Referring to FIG. 7, the system has a read roller 72 for conveying an original 71 in the transmission mode and a record roller 74 for conveying a recording medium 73 in the reception mode. In image communication (e.g., facsimile communication), the read roller 72 is driven in the transmission mode, the record roller 74 is driven in the reception mode, and both the rollers 72 and 74 are driven in the copying mode.

However, in the reception mode, the read roller 72 can also be driven in addition to the record roller 74. In this case, a single common reversible motor 75 is used. A rotating shaft (primary mover shaft) 76 of the motor 75 is rotated in the forward direction (X-direction) in the transmission mode, and in the reverse direction (Y-direction) in the reception or copying mode. One-way clutches 77 and 78 for transmitting motor rotation in only predetermined directions are mounted on the shaft 76. A one-way clutch 81 is mounted on a driven shaft 80 which is driven by the shaft 76 through a pair of gears (gear pair) 79.

Only when the motor rotating shaft 76 is rotated in the X-direction, does the one-way clutch 77 transmits the rotation to the read roller 72 through a belt 82. When the shaft 76 is rotated in the Y-direction, the clutch 77 does not transmit the rotation. Similarly, only when the motor rotating shaft 76 is rotated in the Y-direction, does the one-way clutch 78 transmits the rotation to the record roller 74 through a belt 84. When the shaft 76 is rotated in the X-direction, the clutch 77 does not transmit the rotation. Only when the driven shaft 80 is rotated in an X'-direction through the gear pair 79, does the one-way clutch 81 transmits the rotation. When the shaft 80 is rotated in the reverse direction, the clutch 81 does not transmit the rotation.

In the transmission mode, the motor 75 is rotated in the X-direction. Therefore, the rotation of the motor 75 is transmitted only by the clutch 77, and the remaining clutches 78 and 81 slip. In this case, rotational is transmitted only to the read roller 72 through the belt 82, and the original 71 is fed in the direction indicated by arrow A.

In the reception or copying mode, the motor 75 is rotated in the Y-direction. The one-way clutches 78 and 81 transmit the rotation but the clutch 77 does not. In this case, the rotation is transmitted to the read roller 72 through a belt 83 as in the transmission mode, and to the roller 74 through the belt 84. Both the rollers 72 and 74 are therefore rotated simultaneously.

In the system having the above configuration, transmission, reception and copying can all be performed with a single motor. However, in the reception or copying mode, rotation must be simultaneously transmitted to the rollers 72 and 74. For this reason, a motor having a higher torque than that when two motors are used is required. When such a high-torque motor is used, the manufacturing cost, motor size and heat generated are all increased, thus compromising compactness and low cost of the system.

In view of the above situation, an apparatus which requires only a single motor of a low torque has been desired.

SUMMARY OF THE INVENTION

It is an object of the present invention to improve an image processing apparatus.

It is another object of the present invention to eliminate the above problem.

It is still another object of the present invention to provide an image processing apparatus which can form a high-quality image even with a buffer memory having a relatively small capacity.

It is still another object of the present invention to provide an image processing apparatus which interrupts image reading in accordance with the state of the image being read when a predetermined amount of image data is read.

It is still another object of the present invention to provide an image processing apparatus which interrupts image reading in accordance with the state of the image being read when a predetermined amount of image data is recorded.

It is still another object of the present invention to provide an image processing apparatus which can perform appropriate image reading and recording using a single drive means.

It is still another object of the present invention to provide an image processing apparatus which can perform image reading and recording using only a single drive means and can reduce a load on the single drive means.

The above and other objects, features and advantages of the present invention will become apparent from the following description when taken in conjunction with the following description.

BRIEF DESCRIPTION OF THE DRAWINGS

FIGS. 3A-B are flow charts of the control sequence of a main control circuit 1 in the reading mode;

FIGS. 6A-B are flow charts of the control sequence of the main control circuit 1 in the recording mode;

DETAILED DESCRIPTION OF THE PREFERRED EMBODIMENTS

The preferred embodiments of the present invention will be described with reference to the accompanying drawings.

Figure 1:
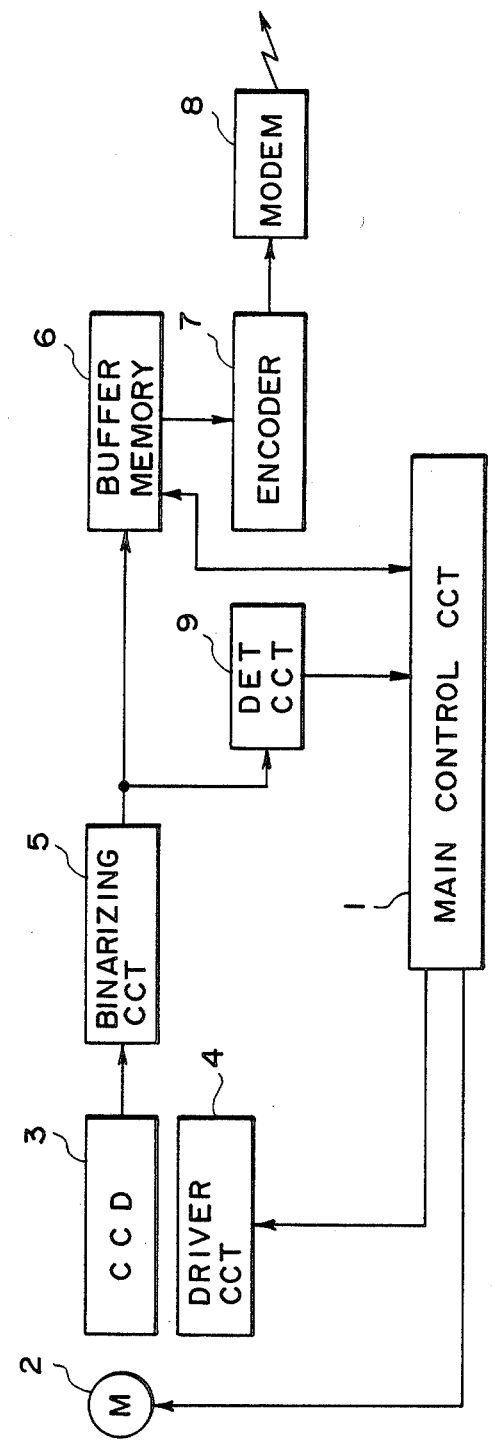
FIG. 1 is a block diagram showing the overall configuration of a transmission section of a facsimile system according to an embodiment of the present invention.

FIG. 1 is a block diagram showing the construction of a transmission section of a facsimile system according to an embodiment of the present invention.

Referring to FIG. 1, a main control circuit 1 consists of a microcomputer and its peripheral equipment such as a control memory. The main control circuit 1 controls the overall facsimile system. A convey motor 2 conveys an original to be read in the sub-scan direction. A CCD (charge-coupled device) 3 reads the original. A driver circuit 4 drives the CCD 3. The motor 2, the CCD 3 and the driver circuit 4 sequentially repeats main scan and sub-scan so as to read the original and convert the original image into an image signal (electrical signal).

A binarizing circuit 5 digitizes the image signal obtained by the CCD 3. A buffer memory 6 temporarily stores the digital signal from the circuit 5. The buffer memory 6 has a capacity corresponding to a plurality of lines (within one page).

An encoder 7 reads out the image signal from the buffer memory 6 and encodes it. When the encoder 7 encodes the image signal of one line, it adds an EOL (end-of-line) signal to the end of the signal. A modem 8 modulates the encoded image signal from the encoder 7 and sends it onto a communication line.

A detection circuit 9 detects the state of the one-line image signal. More specifically, the detection circuit 9 detects if the one-line image signal is a nearly black signal or a nearly white signal, and supplies a detection signal to the main control circuit With the above arrangement, the image signal is read and temporarily stored in the buffer memory 6. When the storage amount in the buffer memory 6 reaches a predetermined value, the drive operation of the motor 2 and the driver circuit 4 is stopped in response to a detection signal from the detection circuit 9. When the storage amount of the buffer memory 6 becomes zero, the original reading is resumed.

Figure 2:
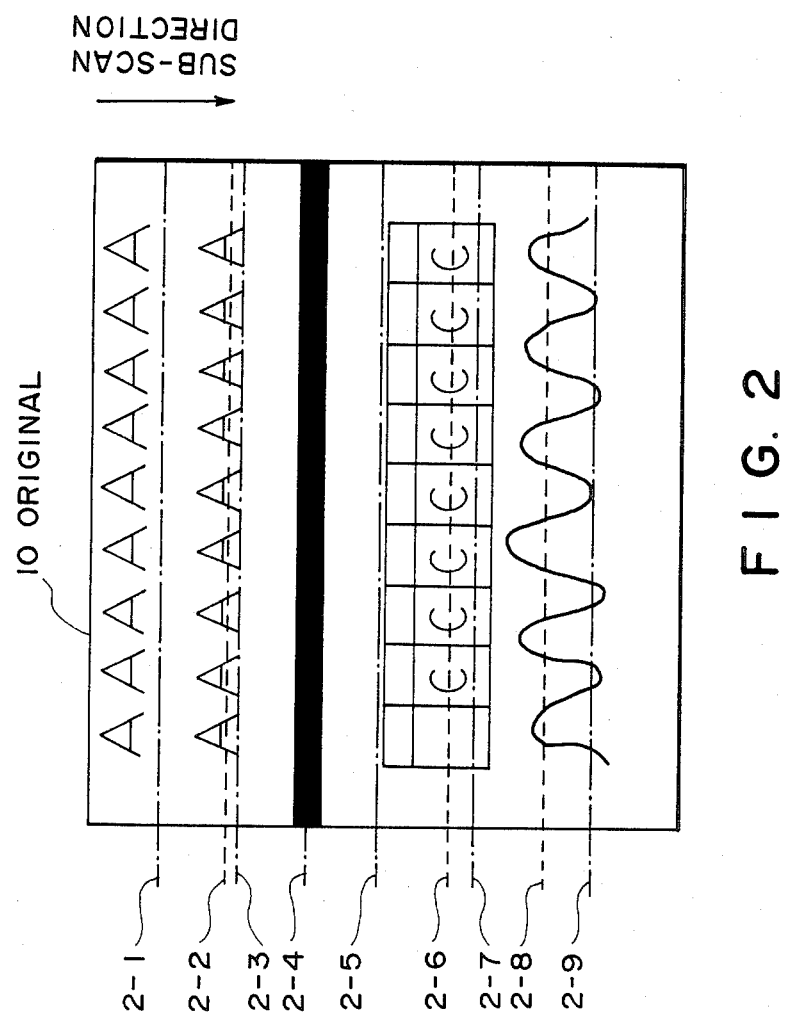
FIG. 2 is a plan view showing an example of read scan of an original.

FIG. 2 shows read scan of an original by the system shown in FIG. 1. As an original 10 is read-scanned and the image signal of a line 2-1 is stored in the buffer memory 6, the storage amount of the buffer memory 6 exceeds a predetermined value. If the detection circuit 9 detects that the one-line image signal is a nearly white signal, further subscan exceeding the line 2-1 is interrupted. Thereafter, when the image signal is read out from the buffer memory 6 and the storage amount therein becomes zero, the reading operation is resumed.

When the storage amount of the buffer memory 6 reaches a predetermined value, if the detection output from the detection circuit 9 does not indicate a nearly white signal as indicated by a line 2-2, the reading operation is continued. However, when the detection output from the detection circuit 9 indicates a nearly white signal as indicated by a line 2-3, read subscan is interrupted until the storage amount of the buffer memory 6 becomes zero.

When the detection output from the detection circuit 9 indicates a nearly black signal as indicated by a line 2-4, read subscan is similarly interrupted.

When the storage amount of the buffer memory 6 exceeds the predetermined value, read scan is continued until the one-line image signal is detected to be a nearly black or white signal by the detection circuit 9. Immediately before the storage amount of the buffer memory 9 exceeds its capacity as indicated by a line 2-9, a signal indicating this situation is output from the buffer memory 6 and is supplied to the main control circuit 1 so as to interrupt read subscan.

Figure 3A:
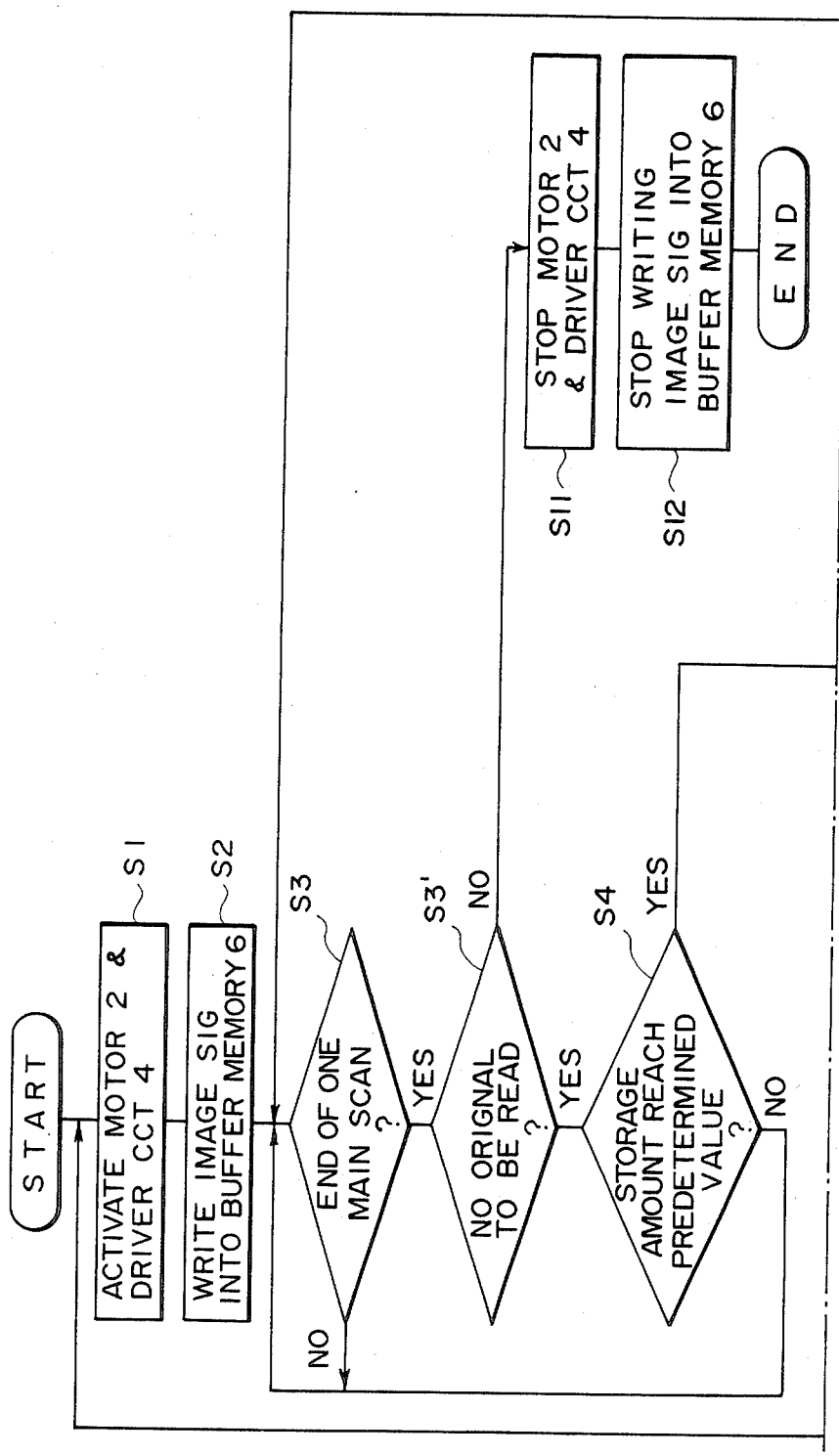

FIG. 3 is a flow chart of the control sequence for original reading by the main control circuit 1 shown in FIG. 1. The control sequence program is stored in a control memory (not shown) in the main control circuit 1.

The mode of operation of the apparatus according to the present invention shown in FIG. 1 will be described with reference to the flow chart shown in FIG. 3.

In step S1, the motor 2 and the driver circuit 4 are driven. In step S2, the image signal read by the CCD 3 is written in the buffer memory 6. The image signals are sequentially read out from the buffer memory 6 and are encoded by the encoder 7. When the encoder 7 encodes each one-line image signal, it adds an EOL signal indicating an end of the line and supplies the resultant signal to the modem 8. Since the encoding speed is normally lower than the reading speed, the storage amount of the image signal in the buffer memory 6 increases.

In step S3, it is checked if one main scan for reading is ended. When YES in step S3, the flow advances to step S3'. It is checked in step S3', if there is no more original to be read or reading of the original is ended. When YES in step S3', the flow advances to step S11. However, if NO in step S3', the flow advances to step S4. It is checked in step S4 if the storage amount of the buffer memory 6 has exceeded a predetermined value. If YES in step S4, the flow advances to step S5. However, if NO in step S4, steps S3 and S4 are repeated.

In step S5, it is checked if a one-line image signal is a nearly white signal. If YES in step S5, the flow advances to step S8. If NO in step S5, the flow advances to step S6. It is then checked in step S6 if the one-line image signal is a nearly black signal. If YES in step S6, the flow advances to step S8. If NO in step S6, the flow advances to step S7. In step S7, it is checked if a signal indicating that the storage amount has exceeded the memory capacity is output from the buffer memory 6. If YES in step S7, the flow advances to step S8. If NO in step S7, the flow returns to step S3. Steps S3, S4, S5, S6 and S7 are repeated until the one-line image signal is either a black or white signal or the storage amount of the buffer memory 6 is detected to have exceeded the capacity.

In step S8, the drive operation of the motor 2 and the driver circuit 4 is stopped so as to stop read subscan. When image write in the buffer memory 6 is stopped in step S9, the flow advances to step S10. In step S10, it is checked if the storage amount of the buffer memory 6 is empty. When YES in step S10, the flow returns to step S1 and original reading is started agains.

When it is determined in step S3' that the original reading is completed, the flow advances to step S11. The motor 2 and the driver circuit 4 are stopped. In step S12, the write operation in the buffer memory 4 is stopped and the reading operation is ended.

In this embodiment, a predetermined amount of original data is read. When the storage amount of the image signal in the buffer memory 6 exceeds a predetermined value, if the detection circuit 9 detects that the one-line image signal is a nearly black or white signal, read subscan is interrupted. Therefor, the reading image position will not be shifted and a high-quality image can be obtained.

Instead of detecting if the one-line image signal is a nearly black or white signal, the detection circuit 9 can detect other states of the image signal. For example, the detection circuit 9 can detect if the one-line image signal is an image signal identical to the image signal of the previous line as indicated by a line 2-7 in FIG. 2.

In the flow chart shown in FIG. 3, it is waited until the storage amount of the buffer memory 6 is zero (empty) in step S10. However, when the storage amount of the buffer memory 6 is reduced to a value below a predetermined value, reading operation can be resumed.

In normal original reading, shifting of the reading position presents a problem particularly when small characters or fine graphic patterns are read. For this reason, in this embodiment, the capacity of the buffer memory 6 can be one sufficient to store characters having a size of 3 to 4 mm, e.g., about 40 lines.

The detection circuit 9 operates in the following manner. When 90% or more (preferably 95% or more) of image signal components in the one-line image signal are black or white signals, the one-line image signal is detected to be a nearly black or white signal.

In summary, according to this embodiment, the positions of intervals between the reading operations for reading an original image by sequentially repeating main scan and subscan correspond to image portions with almost no change in image signal. Therefore, an image processing apparatus which can reproduce a high-quality image can be provided.

The recording operation of the facsimile system according to this embodiment will be described.

Figure 4:
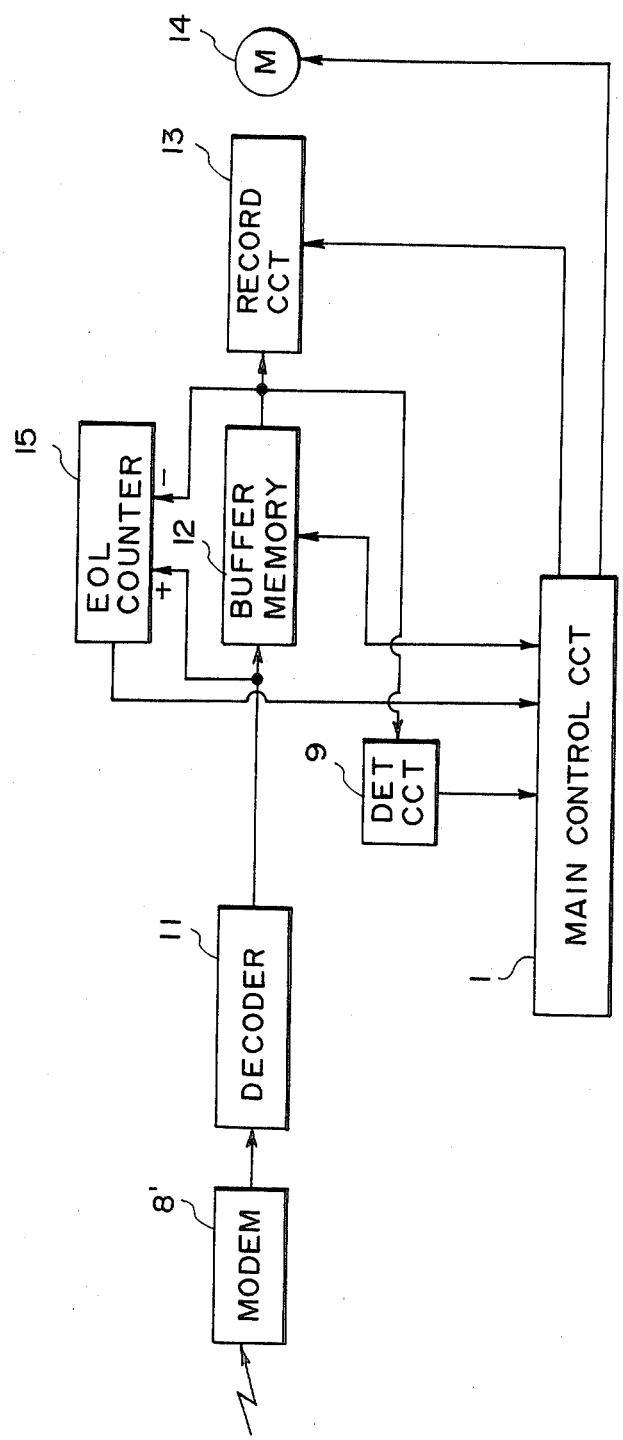
FIG. 4 is a block diagram showing the overall configuration of a reception section of the facsimile system according to the embodiment of the present invention.

FIG. 4 is a block diagram showing the construction of a recording section of the facsimile system according to this embodiment.

The same reference numerals as in FIG. 1 denote the same parts in FIG. 4, and a detailed description thereof will be omitted.

A modem 8' demodulates an image signal received through a communication line. A decoder 11 decodes the image signal demodulated by the modem 8'. A buffer memory 12 temporarily stores the decoded image signal. The buffer memory 12 has a memory capacity corresponding to a plurality of lines.

A detection circuit 9 detects the state of a one-line image signal output from the buffer memory 12. More specifically, the detection circuit 9 detects if the one-line image signal is a nearly black or white signal and supplies a detection signal to a main control circuit 1.

A record circuit 13 reads out the image signal from the buffer memory 12 and records the readout image signal. In response to an instruction signal from the main control circuit 1, the record circuit 13 records an image on recording paper (not shown) by sequentially repeating main scan and subscan. A motor 14 conveys the recording paper in the subscan direction.

An EOL counter 15 counts the EOL signals each representing an end of a line in the image signal. The EOL counter 15 counts up the EOL signals written in the buffer memory 12 and counts down the EOL signals read out from the buffer memory 12. Thus, the EOL counter 15 detects the storage amount of the image signal stored in the buffer memory 12 and supplies a detection signal to the main control circuit 1.

With the recording section having the above arrangement, when the storage amount of the image signal in the buffer memory 12 becomes less than a predetermined value, if the detection circuit 9 detects that the one-line image signal is a nearly black or white signal, it supplies a detection signal to the main control circuit 1. Then, the main control circuit 1 stops driving operation of the record circuit 13 and the motor 14, and the record subscan is interrupted. When the storage amount of the image signal in the buffer memory 12 exceeds the predetermined value, the record operation is resumed.

Figure 5:
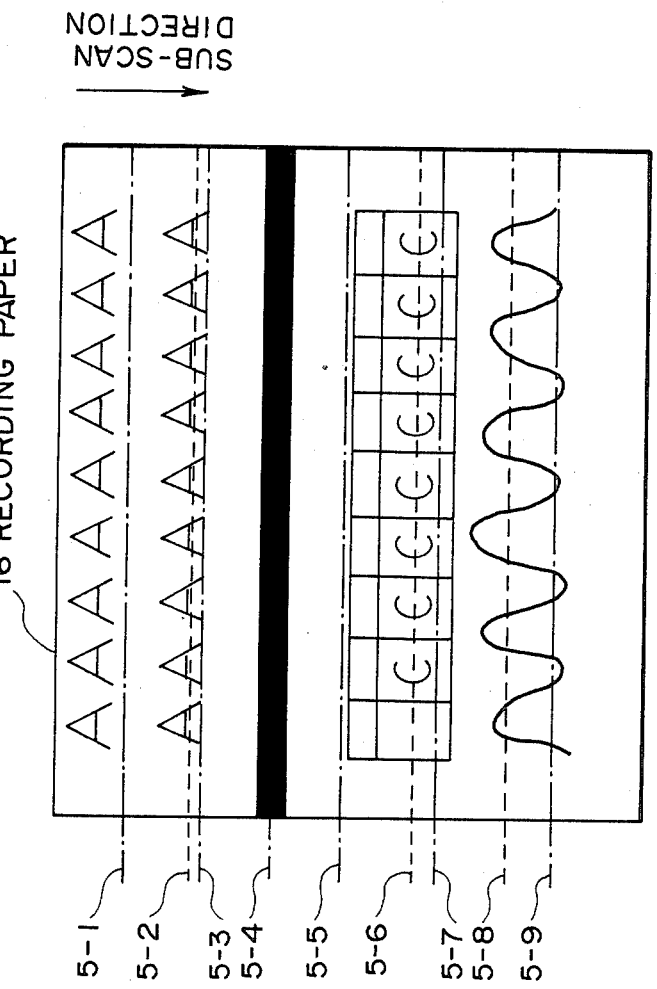
FIG. 5 is a plan view showing an example of record scan.

FIG. 5 shows an example of the image recording operation in the apparatus shown in FIG. 4. When recording is performed up to a line 5-1 during recording on recording paper 9, if the storage amount of the buffer memory 12 becomes less than the predetermined value and the one-line image signal is detected to be a nearly white signal by the detection circuit 9, record subscan is interrupted.

When recording is performed up to a line 5-2, even if the storage amount of the buffer memory 12 becomes less than the predetermined value, the one-line image signal is not detected to be a nearly white signal by the detection circuit 9. Therefore, recording is continued up to a line 5-3. During recording of the line 5-3, when the one-line image signal is detected to be a nearly white signal, the recording operation is interrupted.

When the one-line image signal is detected to be a nearly black signal by the detection circuit 9 during recording of a line 5-4, the recording operation is interrupted as in the case for detection of a nearly white signal.

Even when the storage amount of the buffer memory 12 becomes less than the predetermined value at positions corresponding to lines 5-8 and 5-9, the one-line image signals are not detected to be a nearly black or white signal. Therefore, the recording operation is continued. When all the image signals stored in the buffer memory 12 are recorded, the recording operation is ended.

Figure 6A:
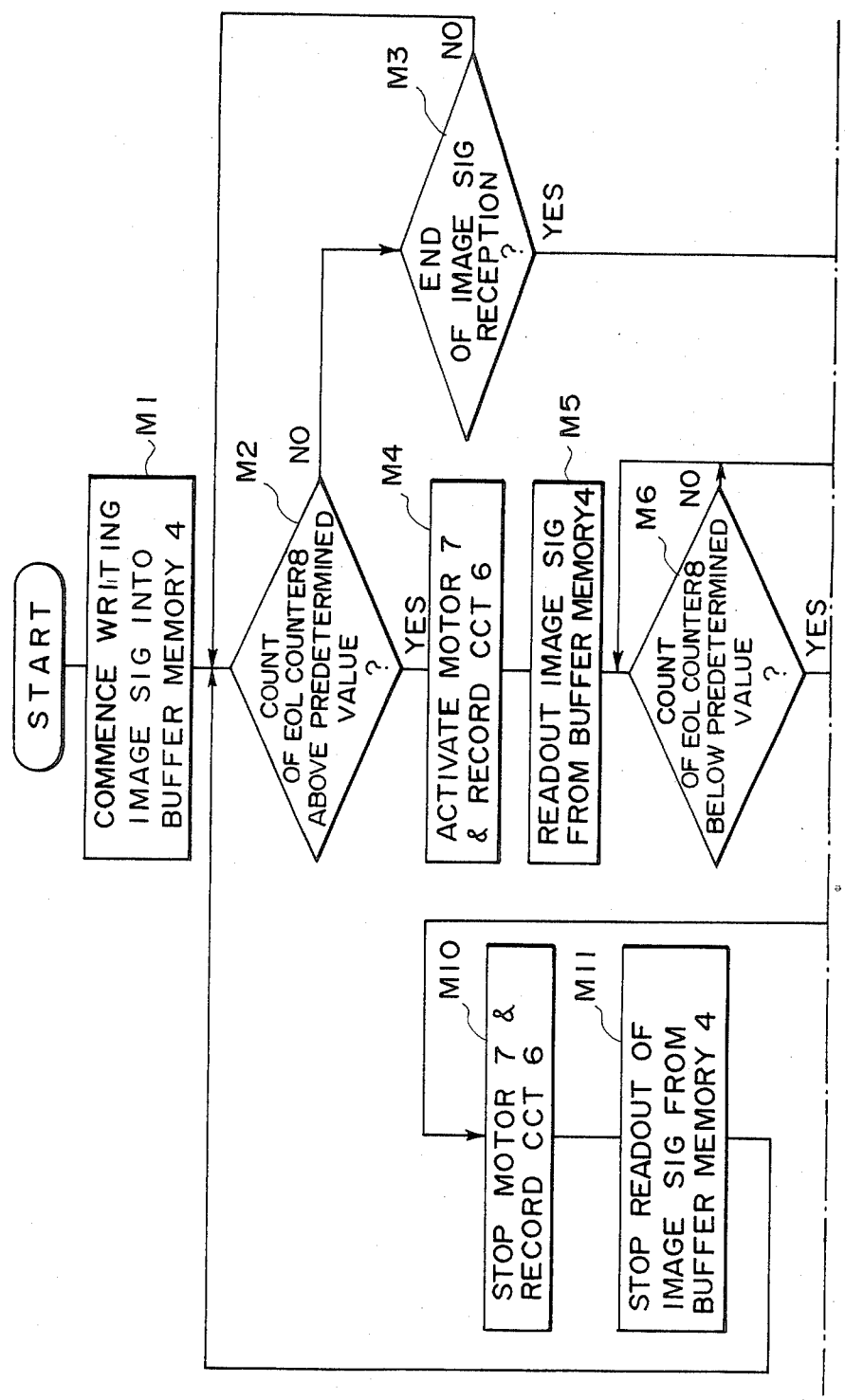

FIG. 6 shows a flow chart of the control sequence for the recording operation of the main control circuit 1. The control program is stored in a control memory (not shown) in the main control circuit 1.

The mode of operation of the recording section shown in FIG. 4 will be described with reference to the flow chart shown in FIG. 6. In step M1, a write instruction signal for writing the received image signal in the buffer memory 12 is supplied to the buffer memory 12 and image signal write is started. In step M2, it is checked if the count of the EOL counter 15 is above a predetermined value. If YES in step M2, the flow advances to step M4. However, if NO in step M2, the flow advances to step M3. In step M3, it is checked if the image signal reception is ended. If NO in step M3, the flow returns to step S2. However, if YES in step M3, the flow advances to step M12.

Steps M2 and M3 are repeated until the image signal is stored in an amount exceeding a predetermined amount in the buffer memory 12.

When a predetermined amount of the received image signal is written before image signal reception ends, the motor 14 and the record circuit 13 are driven in step M4. The image signal is read out from the buffer memory 12 in step M5, and the flow then advances to step M6.

In step M6, it is checked if the count of the EOL counter 15 is less than a predetermined value, i.e., if the storage amount of the image signal in the buffer memory 12 is less than a predetermined value. When YES in step M6, the flow advances to step M7.

In step M7, it is checked if a detection signal from the detection circuit 9 indicates a nearly white image signal. If YES in step M7, the flow advances to step M10. However, if NO in step M7, the flow advances to step M8.

In step M8, it is checked if a detection signal from the detection circuit 9 indicates a nearly black signal. If YES in step M8, the flow advances to step M10. However, if NO in step M8, the flow advances to step M9.

In step M9, it is checked if the count of the EOL counter 15 has become zero. If YES in step M9, the flow advances to step M10. However, if NO in step M9, the flow returns to step M6.

Steps M6, M7, M8 and M9 are repeated until it is determined in step M7 that the one-line image signal is a nearly white signal, in step M8 that the one-line image signal is a nearly black signal, or in step M9 that the storage amount in the buffer memory 12 is zero.

In step M10, the motor 14 and the record circuit 13 are stopped so as to stop record subscan. In step M11, read out of the image signal from the buffer memory 12 is stopped, and the flow returns to step M2.

Steps M2 to M11 are repeated to perform recording operation until NO in step M2 and YES in step M3. When reception of the image signal is ended (YES in step M3), the flow advances to step M12.

In step M12, write of the image signal in the buffer memory 12 is stopped. When it is determined in step M13 that all the image signals stored in the buffer memory 12 have been recorded, the motor 14 and the record circuit 13 are stopped so as to stop read out of the image signal from the buffer memory 12 and to stop the recording operation in step M14.

In this embodiment, when a predetermined amount of image data is recorded, if the detection circuit 9 detects that the one-line image signal is a nearly black or white signal, record subscan is interrupted. Therefore, the image position shift does not occur at the boundary between the images, and a high-quality image can be formed.

The detection circuit 9 need not always detect if the one-line image signal is a nearly black or white signal. For example, as shown in a line 5-7 in FIG. 5, the detection circuit 9 can detect that the one-line image signal is the same as the immediately preceding line.

In normal image recording, image position shift becomes a problem in recording relatively small characters or fine graphic patterns. For this reason, the buffer memory 12 to be used in this embodiment need only have a capacity of several lines for storing characters having a size of about 3 to 4 mm, e.g., about 40 lines.

When 90% or more (preferably 95% or more) of the one-line image signal components are nearly black or white signal components, the detection circuit 9 can determine that the one-line image signal is a nearly black or white signal.

As described above, according to this embodiment, when main scan and subscan are sequentially repeated to perform image recording, the boundary between each recording operation corresponds to image signals having substantially no changes. Therefore, images without abrupt changes, i.e., images of high quality can be formed, and an inexpensive image processing apparatus can be provided.

A facsimile system for performing image reading and recording with a single motor according to another embodiment of the present invention will be described below.

Figure 8:
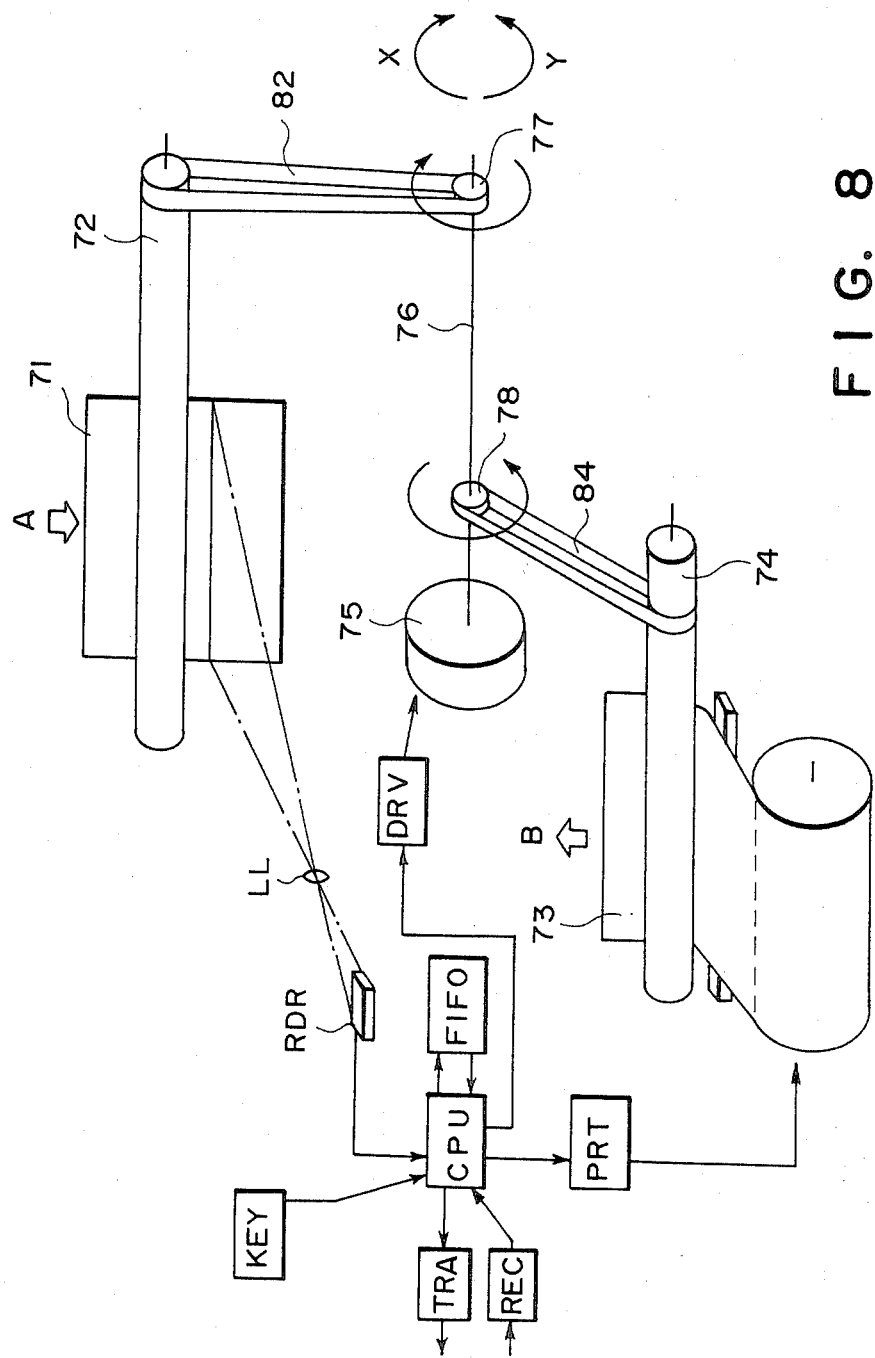
FIG. 8 is a view showing the construction of a facsimile system according to another embodiment of the present invention.

FIG. 8 is a block diagram showing the overall configuration of a facsimile system according to this embodiment.

Figure 7:
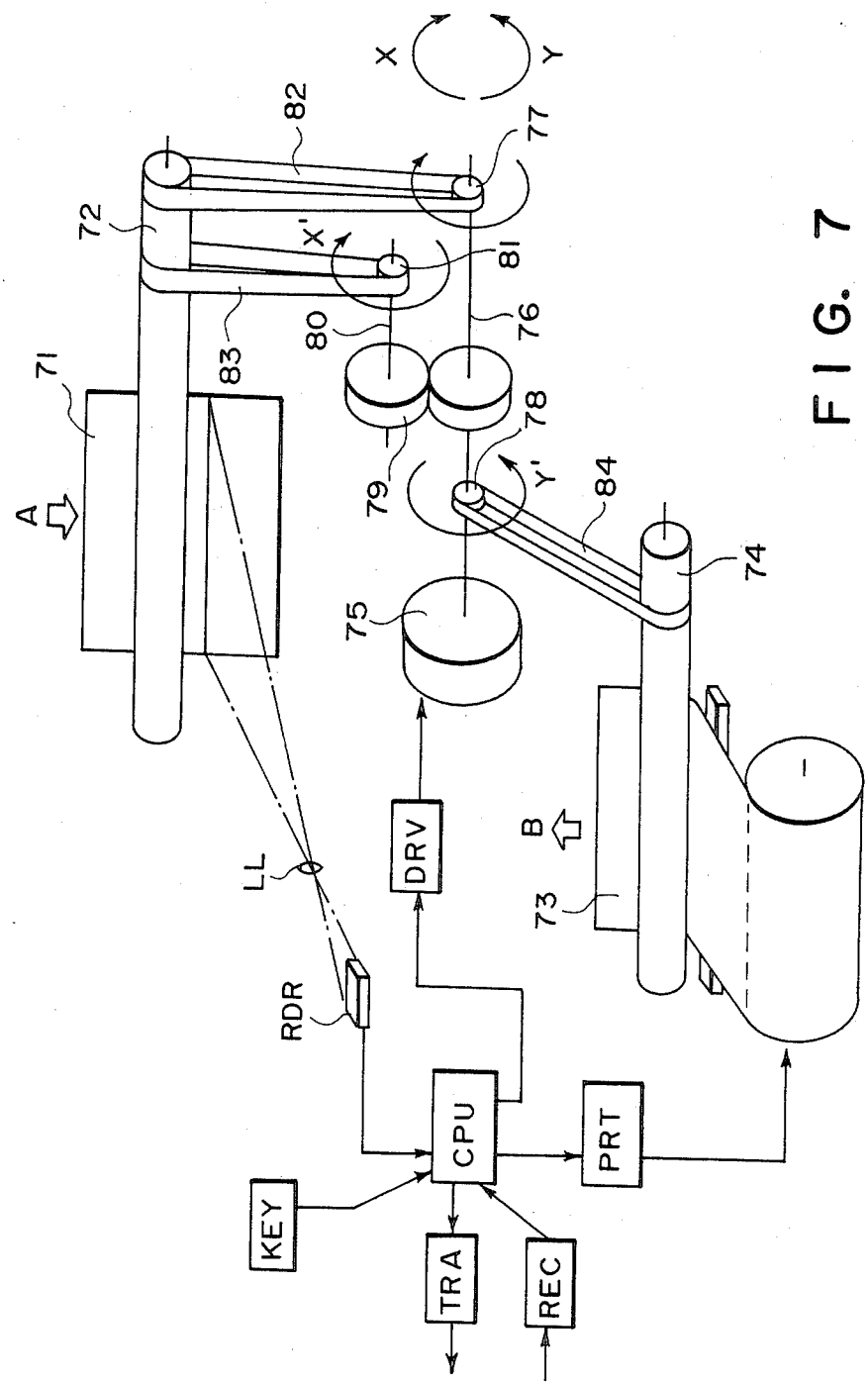
FIG. 7 is a view showing the construction of a facsimile system which operates with a single motor.

The facsimile system shown in FIG. 8 corresponds to the system shown in FIG. 7 without the gear pair 79, the driven shaft 80, the one-way clutch 81, and the belt 83.

In the transmission mode, a microprocessor CPU drives a motor 75 in the X-direction through a drive section DRV. Rotation of the motor 75 in the X-direction is transmitted to a read roller 72 through a motor rotating shaft 76, a one-way clutch 77 and a belt 82. In this case, a one-way roller 78 slips, and the motor rotation is not transmitted to a record roller 74. Therefore, in the transmission mode, only an original 71 is fed, and an original image is transmitted. In the reception mode, the microprocessor CPU drives the motor 75 in the Y-direction through the drive section DRV. The rotation of the motor 75 in the Y-direction is transmitted to the record roller 74 through the motor rotating shaft 76, a one-way clutch 78 and a belt 84. In this case, the one-way clutch 77 slips, and the rotation is not transmitted to the read roller 72. Therefore, in the reception mode, recording paper 73 is fed, and a received image is recorded.

Figure 9:
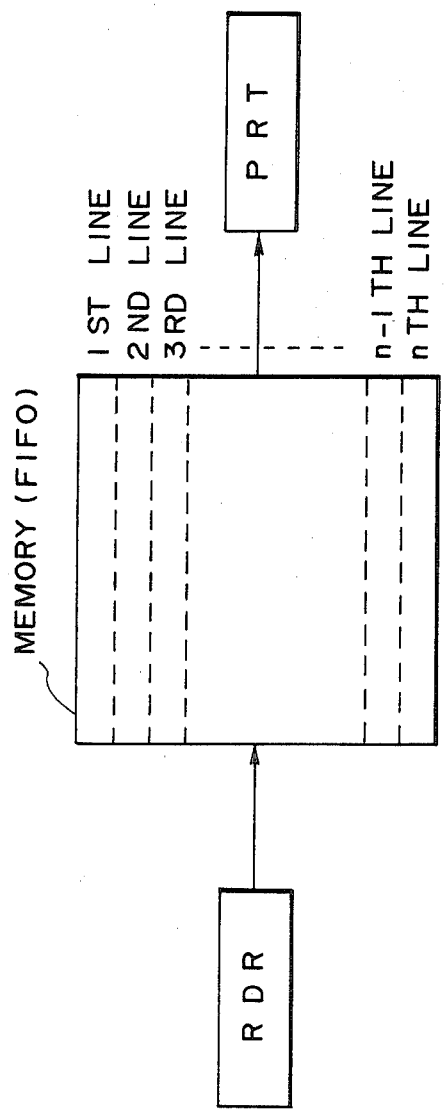
FIG. 9 is a diagram showing the case wherein raw data is stored in a memory FIFO in FIG. 8.

In the copying mode, the microprocessor CPU drives the motor 75 alternately in the X- and Y-directions through the drive section DRV. More specifically, the motor 75 is rotated for a predetermined angle in units of lines in the X-direction, and image information of the original 71 is read by a reading section RDR through a lens system LL. The read information is temporarily stored in a memory FIFO as shown in FIG. 9. Next, the motor 75 is rotated in the Y-direction to feed the recording paper 73 while the information stored in the memory FIFO is read out and recorded on the recording paper 73 through a recording section PRT. The motor 75 is then rotated through another predetermined angle in the X-direction to read more image information on the original 71, the read information is temporarily stored in the memory FIFO, and the motor 75 is rotated in the Y-direction to record the information stored in the memory FIFO. In this manner, the reading and recording operations are repeated until an image of one page is recorded, and thereafter the copy operation is completed.

With the system of this embodiment having the above arrangement, the load on the motor 75 in the transmission, reception or copying mode is only the read roller 72 or the record roller 74. Therefore, even if a single motor is used, the load on the motor 75 in the copying mode can be reduced to a value equivalent to that in the transmission or reception mode.

When the rotating direction of the motor 75 is alternately changed as described above, the image may be influenced by the backlash by the drive system other than the motor. In order to solve this problem, in this embodiment, the backlash amount is determined by counting pulses, and the backlash correction is performed in accordance with the determined amount. In an image communication apparatus such as a facsimile system, since an original 71 and recording paper 73 are fed stepwise, the motor 75 also comprises a stepping motor. Therefore, the amount of the backlash of the drive system other than the motor 75 can be counted in units of clock pulses. Each time the motor rotating direction is changed in reading or recording operation, the motor 75 is rotated for an angle corresponding to the backlash and then reading or recording operation is performed in accordance with the sequence control by the microprocessor CPU.

When such backlash correction is performed, the influence of backlash of the drive system can be ignored for normal originals. However, when the rotation of the motor 75 is transmitted through a number of gears and pulleys in the drive system and through equipment of different lots, the backlash amount may not be the same. In order to compensate for such a difference in backlash amount, in this embodiment, a program for changing the rotational amount of the motor 75 for each equipment in accordance with the correction amount of the backlash is stored in the control program memory of the microprocessor CPU.

Figure 10:
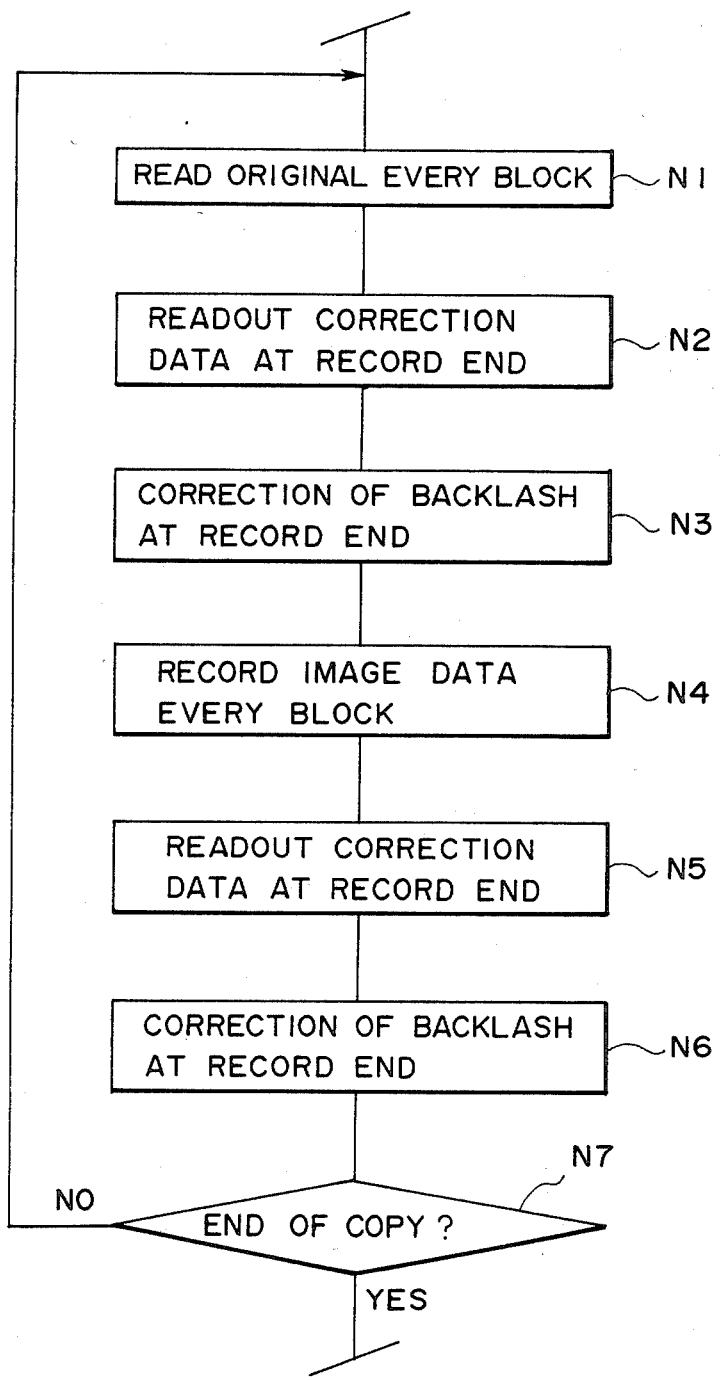
FIG. 10 is a flow chart of the control sequence of a main control circuit according to the embodiment shown in FIG. 8.

FIG. 10 shows a flow chart showing the control sequence of the microprocessor CPU in the copying mode.

The mode of operation of the microprocessor CPU will be described with reference to the flow chart shown in FIG. 10. In step N1, the drive section DRV is controlled to drive the motor 75 in the X-direction so as to read the original 71 by the reading section RDR in synchronism with the feeding of the original 71. The read image data is stored in the memory FIFO, and when reading of one block is completed, the flow advances to step N2. Note that one block indicates a predetermined read amount and corresponds to about 40 lines in this embodiment. The one block need not correspond to 40 lines and is determined by the capacity of the memory FIFO.

In step N2, the data of the correction amount for the backlash set at the record end is read out from a random-access memory (RAM) of the microprocessor CPU. In the initialization of the system, this data of the backlash correction amount in the recording mode is detected and stored in the RAM of the microprocessor CPU. The backlash amount in the reading mode is also detected and stored in the RAM of the microprocessor CPU, as in the case of the recording mode. The motor 75 used in this embodiment is a stepping motor, and the rotational amount of the motor 75 can be determined by the number of pulses generated by an internal encoder. Therefore, the numbers of pulses corresponding to the backlash amounts in the recording and reading modes are stored in the RAM of the microprocessor CPU.

Instead of storing the number of pulses corresponding to the correction amounts in the RAM of the microprocessor CPU, bit or rotary switches can be arranged to determine the number of pulses for correcting backlashes. In this case, in step N2, the data (number of pulses) of the correction amounts set by the bit or rotary switches is fetched.

In step N3, in order to correct the backlash amount in the recording mode, the number of pulses corresponding to the correction amount are supplied to the driven section DRV so as to rotate the motor 75 in the Y-direction for the correction amount.

In step N4, the image data stored in the memory FIFO is read out and the motor 75 is rotated in the Y-direction so as to read image data of one block in synchronism with convey of the recording paper. When recording for one block is ended, the flow advances to step N5.

In step N5, the number of pulses corresponding to the backlash correction amount in the reading mode (when the recording mode is changed to the reading mode) is read out from the RAM.

In step N6, the motor 75 is rotated in the X-direction for a time interval corresponding to the number of pulses corresponding to the backlash correction amount, and the flow advances to step N7.

In step N7, it is checked if the copying operation of the original is ended. If NO in step N7, the flow returns to step N1. However, if YES in step N7, the motor 75 is stopped.

As described above, since the correction amount can be set for each different equipment, variations in different equipment can be compensated.

In the above description, black-and-white binarized data (to be simply referred to as data hereinafter) obtained by digitization of one-line image data read by a read section in a facsimile system has been exemplified. However, since the amount of the raw data of one line is predetermined regardless of the type of image data, the amount of data which can be read by a single feeding operation is constant and is limited by the capacity of the memory FIFO. However, originals which are handled daily have many blank portions at the beginning or end of lines or between lines. If raw data corresponding to such black portions is also stored in the FIFO, the number of lines which can be read by a single scan operation is always the same. However, if the same amount of data is stored regardless of the amount of raw data, the memory cannot be effectively utilized. In this case, if the data is converted into run lengths by a known information compression scheme such as MH, more data can be stored if actual information amount is small. For example, if raw data is directly stored, only 20 lines can be stored. However, if run length conversion is performed, as shown in FIG. 11, 100 lines can be stored in the memory FIFO, thereby a allowing effective utilization of the memory.

Figure 11:
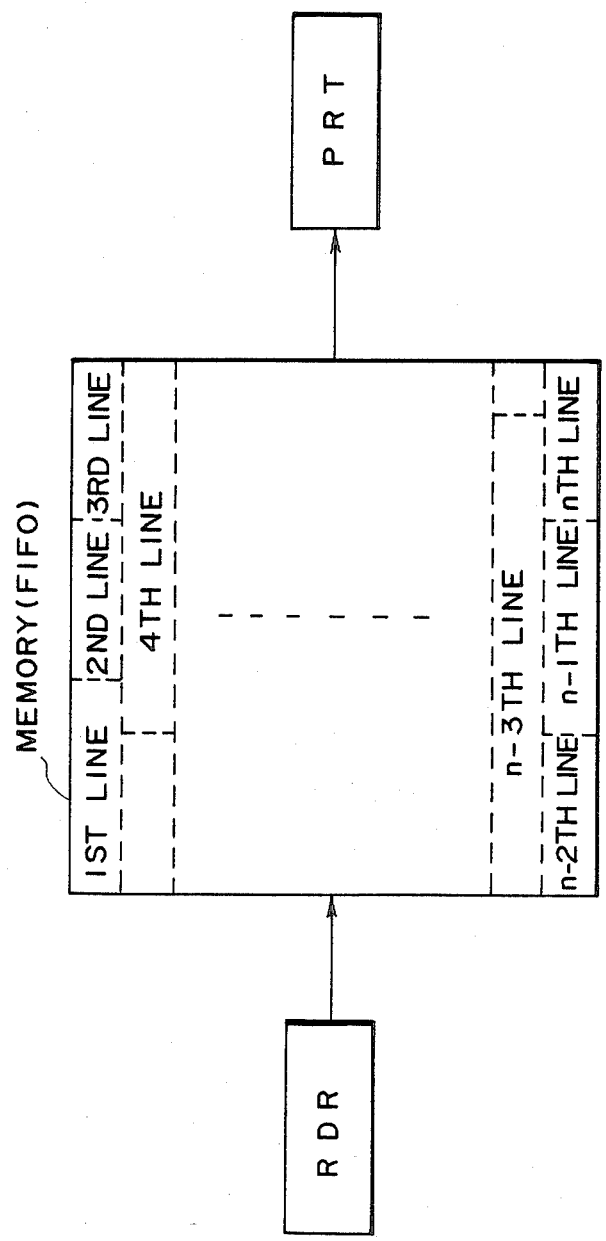
FIG. 11 is a diagram showing the case wherein run-length coded data is stored in a memory FIFO.

With the arrangement shown in FIG. 11, the raw data is converted into run lengths and the resultant data is stored until the memory FIFO is full. Thereafter, the image data is read out from the memory FIFO and recorded. This arrangement provides the following advantages. First, with the previous arrangement, discontinuity in stored image data or recorded images can be prevented by performing backlash correction. However, as long as recording is performed intermittently, the recording density is still discontinuous at the boundary between the recording operations. Although density discontinuity does not present a serious problem in normal originals, it impairs image quality in case of solid black images (e.g., photographs or illustrations). Therefore, such density discontinuity must be reduced to a minimum. However, if the read image data is converted into run lengths and stored in the memory FIFO and then recording operation is performed, the number of lines read and recorded per each reading operation is increased and therefore the number of discontinuous portions in a recorded image is reduced. Density discontinuity occurs when black information succeeds in the subscan direction. When an image particularly a solid black image is converted into run lengths, the amount of the converted data is smaller than the original data. Therefore, the size of each discontinuous area in an image can also be reduced. Thus, the advantages obtained by data compression are considerable.

When a switching timing between the reading and recording operations corresponding to an all-white line in an original, the density discontinuity does not appear in a recorded image. If an all-white line is not present, if a switching between the reading and recording operations is performed corresponding to a nearly white line or a line having a very small amount of black signal components, a density discontinuity, if present, is hard to notice.

The control sequence in this embodiemnt will be described in more detail with reference to the flow chart shown in FIG. 12. After initialization (step ST1), read image data is accumulated in the memory FIFO (step ST2). When the storage amount of the image data in the memory FIFO exceeds a predetermined value (step ST3), if all-white information is received (ST5), the reading operation is stopped and recording operation is performed (ST6). If all-white informaiton is not set after the storage amount in the memory FIFO exceeds the predetermined value (ST4), the reading operation is ended and the recording operation is started when the memory FIFO is full. Normally, an original has all-white informaiton corresponding to a line spacing, and the flow thus advances to step ST5 to ST6 and density discontinuity only rarely occurs. If informaiton having a white component ratio higher than a predetermined ratio is sent in place of the all-white informaiton after the storage amount of the memory FIFO exceeds a predetermined value, the reading operation can be stopped and the recording operation can be started.

Figure 12:
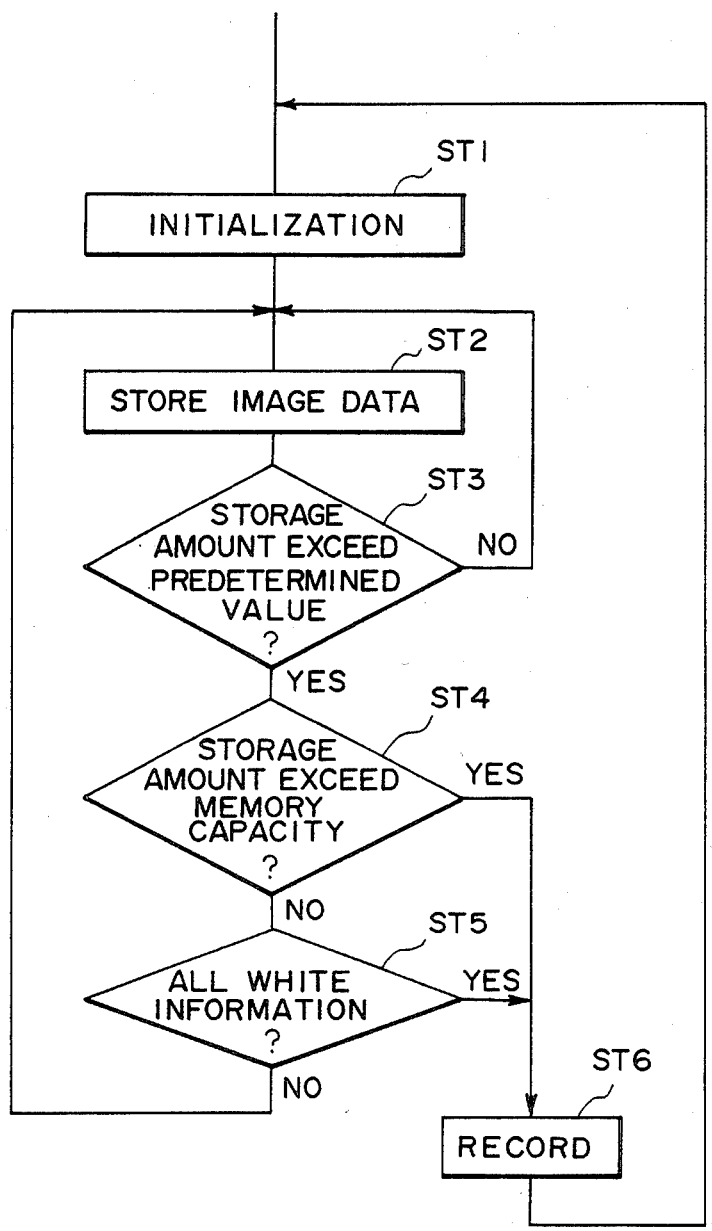
FIG. 12 is a flow chart showing the control sequence of a CPU when data is stored in a memory FIFO until specific information is received.

In the control sequence shown in FIG. 12, image information shifting due to backlash can be prevented. Image information to be correctly read normally has many black and white components mixed together within a line. Information having all-black or all-white components is not generally important in image processing. In addition, such all-black or all-white information frequently occurs successively in several lines. A normal line spacing in an original also corresponds to several facsimile subscan lines since a normal facsimile system subscan interval is about 0.26 mm. Therefore, if the reading operation is stopped and the recording operation is started when all-black or all-white information appears as in step ST5 in FIG. 12, information distored by backlash is not processed and no problem occurs. A similar effect can also be obtained if such a switching from the reading operation to the recording operation is performed when image data having a black or white component ratio exceeding a predetermined ratio is received.

The above description has been made with reference to the case wherein the capacity of the memory FIFO is relatively small. However, if the memory has a capacity corresponding to one page, the problems of image distortion and density discontinuity due to backlash are solved. That is, since original image data of one page is read by a single reading operation and is recorded, the image data is not influenced by backlash. In addition, since a single motor is used, the load in the copying mode is the same as in the reading or recording mode.

In this embodiment, the rotational force of the motor is transmitted through a belt. However, a transmission mechanism such as a gear can be used instead.

According to the embodiment described above, the number of drive motors can be reduced to one, and the load on the motor is not increased despite such a reduction in number of motors used. In addition, although a single motor is used, the motor load in the copying mode can be reduced to be the same as in the reading or recoridng mode, and the image distortion and dinsity discontinuity due to backlash can be prevented.

When the memory has a capacity corresponding to one page or more of the original, the problem of the influence of backlash is prevented.

When the backlash correction amount is set variable by driving a single motor in the forward or reverse direction, variations in the backlash amounts in different equipment can be compensated.

Although the above embodiments have been described with reference to facsimile systems, the present invention is not limited to facsimile systems. The present invention can be applied to all kinds of image processing apparatuses such as image scanners for reading images, printers for recording images, and facsimile systems for reading and recording images.

What is claimed is:

1. An image rpocessing apparatus comprising:
   reading means for reading an image by sequentially repeating main scan and subscan:
   memory means for storing image data associated with the image read by said reading means;
   processing means for processing the image data stored in said memory means;

detecting means for detecting whether a read image corresponding to one main scan represents a monotonous image pattern or not; and control means for controlling said reading means to termporarily interrupt its reading operation by suspending the sub-scan in response to an output from said detecting means when an amount of the image data stored in said memory means exceeds a predetermined value.

2. An apparatus according to claim 1, wherein said detecting means detects if an image signal of one main scan is a nearly white signal or an all-white signal.

3. An apparatus according to claim 1, wherein said detecting means detects if an image signal of one main scan is a nearly black signal or an all-black signal.

4. An apparatus according to claim 1, wherein said control means controls said reading means to resume its interrupted reading operation when said processing means processes all of the image data stored in said memory means.

5. An apparatus according to claim 1, wherein said control means temporarily interrupts subscan of said reading means in response to an output from said detecting means when an amount of image data exceeding a predetermined value is stored in said memory means.

6. An apparatus according to claim 1, wherein said memory means is a buffer memory having a capacity corresponding to a plurality of lines.

7. An apparatus according to claim 1 wherein said processing means encodes the image data stored in said memory means and sends the coded image data through a communication line.

8. An apparatus according to claim 1, wherein said control means temporarily interrupts the reading operation of said reading means regardless of the output from said detecting means when image data corresponding to a capacity of said memory means is stored therein.

9. An image processing apparatus comprising:
recording means for recording an image by sequentially repeating main scan and subscan;
memory means for storing image data associated with the image to be recorded by said recording means;
processing means adapted to consecutively store the image data in said memory means;
detecting means for detecting whether an image to be recorded corresponding to one main scan represents a monotonous image pattern; and
control means for controlling said recording means to temporarily interrupt its recording operations by suspending the subscan in accordance with an amount of the image data stored in said memory means and an output from said detecting means.

10. An apparatus according to claim 9, wherein said detecting means detects if an image signal of one main scan is a nearly white signal or an all-white signal.

11. An apparatus according to claim 9, wherein said detecting means detects if an image signal of one main scan is a nearly black signal or an all-black signal.

12. An apparpatus according to claim 9, wherein said control means controls said recording means to temporarily interrupt its recording operation when an amount of the stored image data is equal to or less than a predetermined value and to resume its interrupted recording operation when an amount of the stored image data is equal to or more than a predetermined value.

13. An apparatus according to claim 9, wherein said processing means receives coded image data sent through a communication line, decodes the received image data and storees the coded image data in said memory means.

14. An apparatus according to claim 9, wherein said memory means is a buffer memory having a capacity corresponding to a plurality of lines.

15. An apparatus according to claim 9, wherein said control means temporarily interrupts subscan by said recording means when there becomes no image data stored in said memory means.

16. An image processing apparatus comprising:
a read roller for feeding an original in a subscan direction;
a record roller for feeding a recording medium in the sub-scan direction;
a common drive source for driving said read and record rollers;
first transmission means for transmitting rotation of said drive source in only direction to said read roller;
second transmission means for transmitting rotation of said drive source in only the other direction to said record roller;
means for reading an original; and
means for recording image data on said recording medium;
rotational amount setting means for setting a predetermined rotational amount of said drive source at every time when the rotating direction of said drive source is changed;
wherein said reading means or said reocrding means performs its reading or recording operation after said read or record roller is rotated in the subscan direction by the predetermined rotational amount set by said setting means at every time when the rotating direction of said driving source is changed in case that said reading means and said recording means alternatively performs the respective reading and recording operations.

17. An apparatus according to claim 16, wherein said rotational amount setting means has a memory storing rotational amount data, and drive said drive source in accordance with the data stored in said memory at every time when the rotating direction of said drive source is changed.

18. An apparatus according to claim 16, wherein said rotational amount setting means has a switch for setting a rotational amount, and drives said drive source in accordance with a setting value of said switch at every time when the rotating direction of said drive source is changed.

19. An apparatus according to claim 16, wherein said rotational amount setting means sets different rotational amounts when the rotating direction of said drive source is changed from forward to reverse and from reverse to forward.

20. An appratus according to claim 16, further comprising a memory for storing image data read by said reading means.

21. An apparatus according to claim 20, further comprising image transmission means for transmitting image data read by said reading means through a communication line; and reception means for receiving image data transmitted through the communication line.

22. An apparatus according to claim 21, wherein said rotational amounts setting means rotates said drive source when image data of an original obtained by reading the original by said reading means is recorded on a recording medium by said recording means.

23. An apparatus according to claim 16, wherein said drive source is a pulse motor, and said rotational amount setting means sets data of the number of pulses corresponding to a rotational amount of said drive source.

24. An image processing apparatus comprising:
a read roller for feeding an original in a subscan direction;
a record roller for feeding a recording medium in the subscan direction;
a common dirve source for driving said read and record rollers;
first transmission means for transmitting rotation of said drive source in only one direction to said read roller;
second transmission means for transmitting rotation of said drive source in only the other direction to said record roller;
means for reading an orignial;
means for recording image data on a recording medium;
memory means for storing an amount of image data within one page read by reading the original by said reading means; and
control means for alternatively performing reading and recording operations within one page of the original;
wherein said reading and recording means read and record one page of the image data, respectively, by alternatively performing reading and recording operations.

25. An apparatus according to claim 24, wherein said control means has detecting means for detecting a predetermined state of one-line image data, and alternately performs reading and recording operations in accordance with an output from said detecting means.

26. An apparatus according to claim 25, wherein said detecting means detects if the one-line image data is a nearly white signal or an all-white signal.

27. An apparatus according to claim 26, wherein said control means interrupts the reading operation and starts the recording operation when an amount of image data exceeding a predetemined amount is stored in said memory means.

28. An apparatus according to claim 27, wherein said memory means is a buffer memory having a capacity corresponding to a plurality of lines.

29. An apparatus according to claim 28, further comprising transmission means for transmitting image data read by said reading means through a communication line; and reception means for receiving the image data sent through the communication line.

30. An image processing apparatus comprising:
a read roller for feeding an original in a subscan direction;
a record roller for feeding a recording medium in the subscan direction;
a common drive source for driving said read and record rollers;
first transmission means for transmitting rotation of said drive source in only one direction to said read roller;
second transmission means for transmitting rotation of said drive source in only the other direction to said record roller;
reading means for reading an original;
recording means for recording image data on a recording medium; and
memory means for storing image data read by said reading means for each unit exceeding one page of the original.

31. An apparatus according to claim 30, wherein when the image data of the original read by said reading means is recorded by said recording means, the original is read for each unit of one page, and the reading operation is interrupted and said recording means records the image data in said memory means when original data of one page is stored in said memory means.

* * * * *

UNITED STATES PATENT AND TRADEMARK OFFICE
CERTIFICATE OF CORRECTION

PATENT NO. : 4,743,975  Page 1 of 3
DATED : May 10, 1988
INVENTOR(S) : KAZUYA IJUIN It is certified that error appears in the above-identified patent and that said Letters Patent is hereby corrected as shown below:   On The Title Page:

AT [56] IN THE REFERENCES

U.S. Patents, "Perreauct" should read --Perreault--.

COLUMN 1

Line 36, "at seam" should read --at a seam--.

COLUMN 2

Line 7, "transmits" should read --transmit--.
Line 12, "transmits" should read --transmit--.
Line 17, "transmits" should read --transmit--.
Line 23, "rotational" should read --rotation--.

COLUMN 3

Line 13, "following description" should read --accompanying drawings--.

COLUMN 4

Line 48, "buffer memory 9" should read --buffer memory 6--.

COLUMN 5

Line 34, "agains." should read --again.--.
Line 38, "buffer memory 4" should read --buffer memory 6--.
Line 45, "Therefor," should read --Therefore,--.

UNITED STATES PATENT AND TRADEMARK OFFICE
CERTIFICATE OF CORRECTION

PATENT NO. : 4,743,975

DATED : May 10, 1988

INVENTOR(S) : KAZUYA IJUIN

It is certified that error appears in the above-identified patent and that said Letters Patent is hereby corrected as shown below:

COLUMN 6

Line 58, "recording paper 9," should read --recording paper 16,--.

COLUMN 7

Line 31, "step S2." should read --step M2.--.

COLUMN 11

Line 1, "black" should read --blank--.
Line 12, "a" should be deleted.
Line 21, "provented" should read --prevented--.
Line 43, "corresponding" should read --is such as to correspond--.
Line 51, "embodiemnt" should read --embodiment--.
Line 59, "informaiton" should read --information--.
Line 64, "informaiton" should read --information--.
Line 66, "informaiton" should read --information--.
Line 68, "informaiton" should read --information--.

COLUMN 12

Line 18, "distored" should read --distorted--.
Line 44, "recoridng" should read --recording--.
Line 44, "dinsity" should read --density--.
Line 61, "rpocessing" should read --processing--.
Line 63, "subscan:" should read --subscan;--.

UNITED STATES PATENT AND TRADEMARK OFFICE
CERTIFICATE OF CORRECTION

PATENT NO. : 4,743,975

DATED : May 10, 1988

INVENTOR(S) : KAZUYA IJUIN

It is certified that error appears in the above-identified patent and that said Letters Patent is hereby corrected as shown below:

COLUMN 13

Line 5, "termporarily" should read --temporarily--.
    Line 29, "claim 1" should read --claim 1,--.
    Line 59, "apparpatus" should read --apparatus--.

COLUMN 14

Line 1, "storees" should read --stores--.
    Line 14, "sub-scan" should read --subscan--.
    Line 18, "only direction" should read --only one direction--.
    Line 30, "reocrding" should read --recording--.
    Line 37, "performs" should read --perform--.
    Line 41, "drive" (first occurrence) should read --drives--.
    Line 56, "appratus" should read --apparatus--.
    Line 65, "amounts" should read --amount--.

Signed and Sealed this

First Day of November, 1988

Attest:

DONALD J. QUIGG

Attesting Officer

Commissioner of Patents and Trademarks